J. M. WORDEN.
Cow-Tail Holder.

No. 159,490. Patented Feb. 2, 1875.

WITNESSES
Franck L. Durand
C. L. Erick

INVENTOR
James M. Worden
per Alexander + Mason
Attorneys

UNITED STATES PATENT OFFICE.

JAMES M. WORDEN, OF EAST RANDOLPH, NEW YORK.

IMPROVEMENT IN COW-TAIL HOLDERS.

Specification forming part of Letters Patent No. 159,490, dated February 2, 1875; application filed November 21, 1874.

*To all whom it may concern:*

Be it known that I, JAMES M. WORDEN, of East Randolph, in the county of Cattaraugus and in the State of New York, have invented certain new and useful Improvements in Cow-Tail Holders; and do hereby declare that the following is a full, clear, and exact description thereof, reference being had to the accompanying drawings and to the letters of reference marked thereon, making a part of this specification.

The object of my invention is to secure a cow's tail from switching while she is being milked, thus relieving the milker from the annoyance otherwise experienced; and to this end the nature of my invention consists in an adjustable clamp with a leather strap fastened at one end and hooked to a hook at the other end of the clamp, all as hereinafter more fully set forth.

In order to enable others skilled in the art to which my invention appertains to make and use the same, I will now proceed to describe its construction and operation, referring to the annexed drawing, in which—

Figure 1:
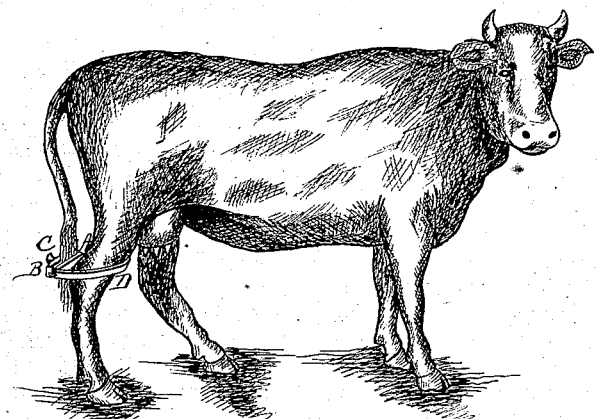
Figure 2:
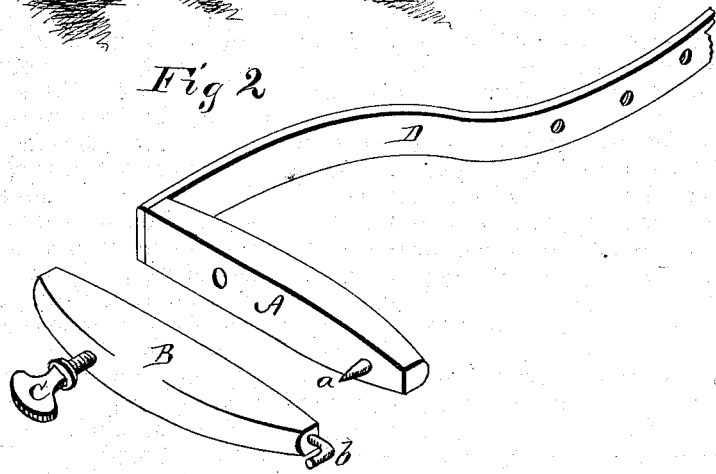

Figure 1 is a side elevation of a cow with my invention applied, and Fig. 2 is a perspective view of the clamp and strap.

The clamp consists simply of two bars, A and B, united by means of a screw, C, and the bar A having a pin, a, near one end, which enters a corresponding hole near the end of the bar B. D is a strap, permanently fastened to one end of the bar A, and provided at the outer end with a series of holes to be fastened on a hook, b, which is inserted in the bar B at the opposite end of the clamp. The strap D is passed around the leg of the animal just above the gambrel and fastened upon the hook b. Some of the hair of the tail of the animal is then put between the clamps at the other end from the hook, and secured there by turning the thumb-screw C.

When the cow is milked, the device is to be removed to the next cow, &c.

When cows are milked in the stable, the device can be fastened to the leg of the milker, and thus the trouble of changing from cow to cow can be avoided.

Having thus fully described my invention, what I claim as new, and desire to secure by Letters Patent, is—

The combination of the clamp A B, thumb-screw C, strap D, and hook b, constructed and used substantially as and for the purposes herein set forth.

In testimony that I claim the foregoing I have hereunto set my hand this 9th day of November, 1874.

JAMES M. WORDEN.

Witnesses:
J. V. GOODWILL,
H. H. FRENCH.